(12) United States Patent
Novotney et al.

(10) Patent No.: US 10,124,915 B2
(45) Date of Patent: Nov. 13, 2018

(54) HOLD DOWN RELEASE MECHANISM WITH INTEGRAL SENSING

(71) Applicant: Ensign-Bickford Aerospace & Defense Company, Simsbury, CT (US)

(72) Inventors: David Novotney, Westfield, MA (US); Geoff Kaczynski, Westlake Village, CA (US); Craig Boucher, Simsbury, CT (US)

(73) Assignee: ENSIGN-BICKFORD AEROSPACE & DEFENSE COMPANY, Simsbury, CT (US)

( * ) Notice: Subject to any disclaimer, the term of this patent is extended or adjusted under 35 U.S.C. 154(b) by 133 days.

(21) Appl. No.: 15/412,409

(22) Filed: Jan. 23, 2017

(65) Prior Publication Data
US 2018/0208331 A1   Jul. 26, 2018

(51) Int. Cl.
*B64G 1/22* (2006.01)
*B64G 1/10* (2006.01)
*B64D 1/00* (2006.01)
*B64G 1/64* (2006.01)

(52) U.S. Cl.
CPC .............. *B64G 1/222* (2013.01); *B64G 1/10* (2013.01); *B64G 1/641* (2013.01); *B64G 1/645* (2013.01); *B64D 1/00* (2013.01); *B64G 1/64* (2013.01); *B64G 2001/643* (2013.01)

(58) Field of Classification Search
CPC ........... B64G 1/222; B64G 1/10; B64G 1/645
See application file for complete search history.

(56) References Cited

U.S. PATENT DOCUMENTS

| | | |
|---|---|---|
| 5,152,482 A | 10/1992 | Perkins et al. |
| 5,695,306 A | 12/1997 | Nygren |
| 6,249,063 B1 | 6/2001 | Rudoy et al. |
| 6,433,990 B1 | 8/2002 | Rudoy et al. |
| 6,525,920 B2 | 2/2003 | Rudoy et al. |
| 6,584,907 B2 | 7/2003 | Boucher et al. |
| 6,747,541 B1 | 6/2004 | Holt et al. |
| 6,889,610 B2 | 5/2005 | Boucher et al. |
| 7,261,028 B2 | 8/2007 | Devries et al. |
| 7,278,658 B2 | 10/2007 | Boucher et al. |
| 8,904,889 B2 | 12/2014 | Rudoy et al. |

(Continued)

FOREIGN PATENT DOCUMENTS

EP       2298648 A1    2/2013

OTHER PUBLICATIONS

European Search Report and Written Opinion for Application No. EP18150253 dated Apr. 18, 2018; (pgs. 7).

*Primary Examiner* — Robert Debaradinis
(74) *Attorney, Agent, or Firm* — Cantor Colburn LLP

(57) ABSTRACT

One aspect of the present invention involves a hold-down and release mechanism ("HDRM") that includes a hold-then-release mechanism configured to hold an element until the hold-then-release mechanism is commanded to release the element; and an integral sensor configured to sense an amount of a parameter of interest associated with the HDRM and to communicate the sensed amount of the parameter of interest to a receiving device. The parameter of interest comprises one of tensile preload, temperature, vibration, shock, and time from application of an HDRM firing current to HDRM release of the element.

20 Claims, 2 Drawing Sheets

(56) References Cited

U.S. PATENT DOCUMENTS

| | | | |
|---|---|---|---|
| 2002/0109588 A1* | 8/2002 | Faye | E05B 83/26 340/426.28 |
| 2013/0009012 A1 | 1/2013 | Kobayashi et al. | |
| 2015/0033882 A1 | 2/2015 | Rudoy et al. | |

* cited by examiner

HOLD DOWN RELEASE MECHANISM WITH INTEGRAL SENSING

BACKGROUND OF THE DISCLOSURE

The subject matter disclosed herein relates in general to hold down and release mechanisms ("HDRMs") for use, for example, on satellites, and in particular to an HDRM that contains an integral sensing device which senses a parameter of interest, such as the amount of an applied tensile preload to the HDRM, and communicates the parameter of interest to a control device.

Launch vehicles typically have multiple stages and are used to carry payloads during travel away from the Earth's surface after the vehicles are launched, and then place or deploy the payloads into orbit or beyond. These payloads are commonly referred to as satellites if they are intended to orbit a body (e.g., Earth) after deployment, or as spacecraft if they are intended to leave the Earth's orbit after deployment. Sometimes the terms "satellites" and "spacecraft" are used interchangeably.

Spacecraft typically utilize hold down and release mechanisms ("HDRMs") (i.e., a "hold-then-separate" device) to securely hold, retain or stow elements of the spacecraft during launch and also during ground transport of the spacecraft to the launch site. These elements, such as solar arrays, antenna reflectors, radiators, instrument booms, propulsion pointing actuators, doors, sensors, etc., are deployed as desired by activating the HDRMs.

An HDRM is generally an electro-mechanical, "one-shot" device in that after it is activated to release its stowed or held element, the HDRM either needs to be replaced, refurbished, or reset—depending on the type of technology that the HDRM employs. An HDRM is typically not a motorized device or other type of device that will return to its original state without some type of external intervention.

HDRMs are generally broadly categorized into three different types: explosive, pyrotechnic, and non-explosive—depending upon the type of activation or actuation mechanism utilized. Explosive and pyrotechnic HDRMs are also both typically referred to as energetic HDRMs, while a non-explosive HDRM or a non-pyrotechnic HDRM is also typically referred to as a non-energetic HDRM. An explosive HDRM is one whose activation mechanism detonates on command, while a pyrotechnic HDRM is one whose activation mechanism burns or deflagrates on command. A non-energetic HDRM is one that typically utilizes an activation mechanism such as a fuse wire or link wire that heats and weakens on command from a control unit when an amount of electrical current passes through the wire, thereby causing it to melt and break. Other types of non-energetic HDRMs utilize a shape memory alloy or utilize the volumetric expansion of certain materials, such as paraffin, when changing from solid to liquid phase. For simplicity, the discussion herein will focus on the fuse wire or link wire style of non-energetic HDRM. However, it can be seen that embodiments of the present invention described herein would be applicable to all types of non-energetic and/or energetic HDRMs.

In a particular type of non-energetic HDRM, when the fuse wire breaks, a release wire that is wrapped around and thereby enclosing the two parts or halves of a cylindrical split spool assembly is released, thereby releasing for movement a pre-loaded device (e.g., a bolt or release pin) attached to the split spool assembly. Release of the bolt or pin subsequently releases a stowed element of the spacecraft. This type of non-energetic HDRM is commonly referred to as a split spool release device ("SSRD"). Other common types of non-energetic HDRMs are commercially available.

In the relevant art, a relatively broad combination of a control unit, a plurality of non-energetic and/or energetic devices, and an interface bus through which signals (e.g., power and data) are sent and received as between the control unit or controller and the non-energetic and/or energetic devices (i.e., two-way communication) is generally referred to as a "networked initiation system." It is a distributed type architecture in which the various components (e.g., the control unit and the non-energetic and/or energetic devices) are located at different places on the launch vehicle or spacecraft and are all connected together by the interface bus.

Also in the relevant art it is known that the various elements (e.g., solar arrays, antenna reflectors, radiators, instrument booms, propulsion pointing actuators, doors, sensors, etc.) that are held, restrained or stowed with respect to the satellite during launch using HDRMs are held or fastened to the satellite prior to launch at desired tensile preload values. The desired tensile preload values are typically applied manually by torqueing a nut or a bolt or some other type of hold down device associated with the HDRM. A typical launch vehicle or spacecraft application may have 50 or more locations where at each location a nut, bolt or some other hold down device is manually torqued to a value that is sufficient to securely hold the various elements in place during launch.

While preload may be applied through torqueing of a nut or bolt, the torque value typically does not provide a direct measurement of the applied tensile preload. Instead, it is common to use an instrumented bolt or a strain gauge together with external test or measuring equipment to measure the amount of the applied tensile preload. The strain gauges are often temporarily secured to the HDRMs. Then, after the satellite has been transported on the ground to the launch site, the strain gauges and test equipment are used again to check the amount of applied tensile preload to ensure that the amount of preload has not changed during travel to the launch site. Once the amount of applied tensile preload has been verified at the launch site, the strain gauges (or at least the wires protruding therefrom) are then removed. Removal of the strain gauge wires introduces the risk of damage to the spacecraft. Also, sometimes HDRMs are inaccessible once the satellite is assembled. Thus, the ability to measure the applied tensile preload may be impossible due to the lack of accessibility to the buried HDRMs. As can be seen from the foregoing, this entire manual measuring process can be a time consuming procedure with inherent risk.

The discussion above is specific to measurement of preload of an HDRM but is can be seen that the ability of an HDRM to measure other parameters, such as temperature, may also have similar advantages.

What is needed is an HDRM that contains an integral sensing device which senses a parameter of interest, such as the amount of an applied tensile preload to the HDRM, and communicates the amount of the sensed tensile preload to a control device for use thereby.

BRIEF DESCRIPTION OF THE DISCLOSURE

According to an embodiment of the present invention, a hold down and release mechanism includes a hold-then-release mechanism configured to hold an element until the hold-then-release mechanism is commanded to release the element; and an integral sensor configured to sense an amount of a parameter of interest associated with the HDRM and to communicate the sensed amount of the parameter of interest to a receiving device. The parameter of interest comprises one of tensile preload, temperature, vibration, shock, and time from application of an HDRM firing current to HDRM release of the element.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION OF THE DISCLOSURE

Figure 1:
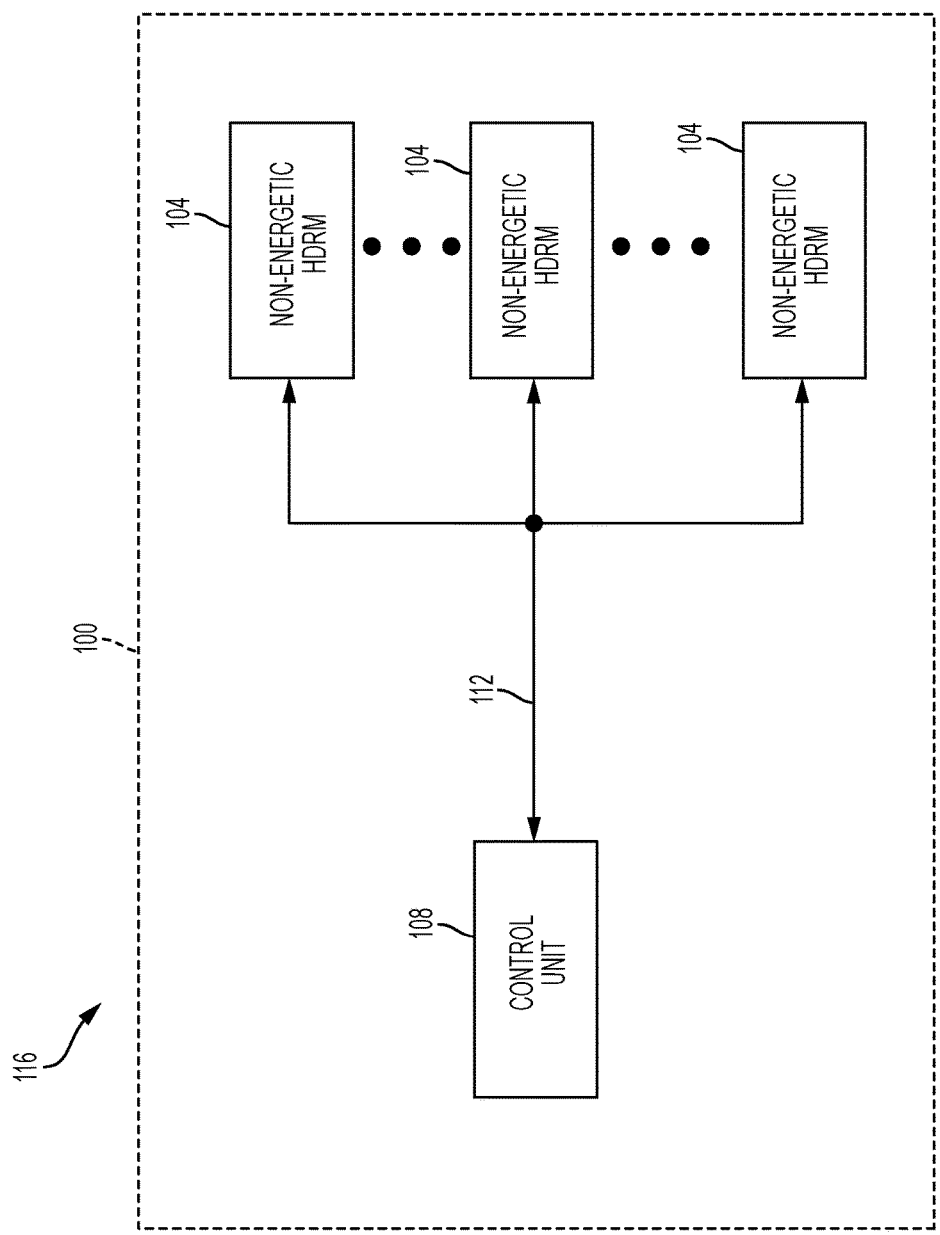
FIG. 1 is a schematic block diagram of a networked initiation system for use with one or more non-energetic HDRMs according to an embodiment of the present invention.

Referring to FIG. 1, a networked initiation system 100 according to an embodiment of the present invention includes one or more (i.e., "at least one") non-energetic hold down and release mechanisms ("HDRMs") 104, a control unit 108, and an interface bus 112 connected between all of the HDRMs 104 and the control unit 108, all of the devices 104, 108 and the interface bus 112 being connected together in a "network" type configuration in the system 100. The interface bus 112 allows for two-way communication between any of the devices 104, 108 connected to the interface bus 112. "Non-energetic" also refers to the HDRMs 104 being primarily non-explosive and/or non-pyrotechnic in nature.

The networked initiation system 100 of FIG. 1 may be part of an aeronautical or aerospace type (launch) vehicle or spacecraft 116 utilized for travel away from the Earth's surface. However, embodiments of the present invention are not limited as such. Instead, the networked initiation system 100 may be utilized in land based applications such as various types of vehicles (e.g., an air bag deployment system in an automobile), or even stationary applications. The networked initiation system 100 may also be used in conjunction with devices or installations located underground, such as missile silos.

A non-energetic HDRM 104 typically includes an activation mechanism such as a link wire or fuse wire that heats and weakens on command from a control unit when an amount of electrical current passes through the link wire, thereby causing it to melt or break relatively quickly from the time the command is given, which ultimately triggers the release of the retained or stowed element on the vehicle.

Non-energetic HDRMs 104 (e.g., the aforementioned split spool release devices ("SSRDs")), may utilize an internal firing capacitor that stores an amount of electrical charge and then releases the charge on command to thereby transmit sufficient energy to break the link wire in the non-energetic HDRM 104, or the electrical charge may be obtained directly from the interface bus 112. When used, the capacitor may be configured to store electrical energy upon receipt of an arming signal on the interface bus 112. As such, the non-energetic HDRM 104 usually does not need any type of separate initiator device associated therewith, as compared to many types of energetic HDRMs. The internal firing capacitor and associated circuitry within the non-energetic HDRM 104 is typically referred to as a capacitive discharge firing unit.

The control unit 108 may comprise a computer, processor, logic array, or similar type of device and may be configured solely to perform the functions required by the networked initiation system 100 of embodiments of the present invention. In the alternative, the control unit 108 may be configured as a portion of a control unit that is configured to carry out other functions on the vehicle 116 besides those of the networked initiation system 100. For example, the control unit 108 may be embodied within the main or primary mission or flight control computer for the vehicle 116. On the other hand, if the control unit 108 is dedicated only to the networked initiation system 100, the control unit 108 may be in communication with the mission or flight control computer for the vehicle 116.

In embodiments of the present invention, the interface bus 112 may comprise a multi-wire bus including separate wires or signal lines for functions such as arming power, operation power, communication and ground. The communication wire or wires may provide address, control, and data signals thereon, and these signals may be digitally coded in a known manner (e.g., the Manchester data bus format) to allow for unique addressing of multiple devices connected to the interface bus 112. In exemplary embodiments, the networked initiation system 100 may be capable of uniquely addressing more than 100 different devices (e.g., HDRMs 104, etc.) connected to the interface bus 112. Thus, each device connected to the interface bus 112 may include some amount of communication circuitry to allow each device to both receive and transmit signals (e.g., address and data) on the interface bus 112 between the control unit 108 and between other devices connected to the interface bus 112. Also, each device connected to the interface bus 112 may contain built-in-test ("BIT") circuitry to perform a self-test of the associated device at one or more defined points in time (e.g., upon power up) and to communicate the results of the BIT to the control unit 108.

Although not an inherent limitation, a typical networked initiation system 100 may include anywhere from 2 to 100 devices connected to the interface bus 112 for two-way communication with the control unit 108. However, by providing the capability to uniquely address and communicate with such a relatively large number of individual devices, embodiments of the networked initiation system 100 of the present invention have an advantage in that the system is scalable. This scalability creates a relatively large amount of flexibility in a networked initiation system 100 by allowing for the easy addition (and subtraction) of uniquely addressable devices within the system 100 in the future without having to reconfigure the system 100; i.e., the controller 108 and the interface bus 112. Each new device connected to the interface bus 112 at a later point in time may simply be assigned one of the remaining available unique addresses at that time.

Other advantages of the single interface bus 112 include that fact that such an interface bus 112 simplifies the overall system wiring, thereby reducing size, weight and power and eliminating undesirable complexity of the networked initiation system 100, while also simplifying the electrical wiring harness required within the physical makeup of the networked initiation system 100.

Thus, as seen from the foregoing, each of the non-energetic HRDMs 104 connected to the interface bus 112 for two-way communication with the control unit 108 may be considered to be a "smart" device in that it not only contains the payload release mechanism but it also contains the electrical or electronic circuitry needed for communication on the interface bus 112 with the control unit 108. The circuitry may include that needed for arming and firing the specific HDRM 104 as well as for BIT of the HDRM 104 and for communicating the then-current state of the HDRM 104 (e.g., armed, ready to fire, etc.) to the control unit 104. In other words, the control unit 108 may communicate with the HDRMs 104 and sensors 120 in a "command and response" type protocol.

In other embodiments of the present invention, the HDRMs 104 may each also contain electrical or electronic circuitry senses a parameter of interest and communicates the sensed amount of the parameter of interest to the control unit. As described in greater detail hereinafter with respect to various embodiments, the parameter of interest may be sensed by a sensing device that is provided or formed integral with the HDRM 104. For example, the parameter of interest may comprise an amount of tensile preload that has been manually applied to a particular portion or component of the HDRM 104; for example, a release pin, a bolt, a nut, etc. This amount of tensile preload may be measured or sensed, for example, by a load sensing device, such as a load washer or similar type of compressive or other type of load sensing device that is integral to the HRDM 104, as described in greater hereinafter with respect to FIGS. 2 and 3.

As described hereinabove with respect to FIG. 1, a networked initiation system 100 according to an embodiment of the present invention includes one or more (i.e., "at least one") non-energetic hold down and release mechanisms ("HDRMs") 104, a control unit 108, and an interface bus 112 connected between all of the HDRMs 104 and the control unit 108, all of the devices 104, 108 and the interface bus 112 being connected together in a "network" type configuration in the system 100. However, it is to be understood that in alternative embodiments of the present invention, the networked initiation system 100 may include instead one or more of each of non-energetic HDRMs and energetic (e.g., explosive or pyrotechnic) HDRMs, or one or more of each of non-energetic HDRMs and other (generic) energetic devices, or one or more of each of non-energetic HDRMs, energetic HDRMs and other (generic) energetic devices. Other types of HDRMs now known or hereinafter created are within the scope of embodiments of the present invention.

An energetic HDRM typically comprises an initiator and an effector for the explosive HDRM. For example, for aeronautical and aerospace vehicles, an initiator that controls an explosive or pyrotechnic (i.e., energetic) effector typically may comprise a hot bridgewire type of initiating element, while the effector is responsive to the initiating element. As such, the energetic HDRM may include within its device package both the initiating element or initiator and the effector.

Various types of explosive HDRMs and pyrotechnic HDRMs include, for example, separation bolts, frangible nuts, bolt cutters, fairing release devices, actuators, engine igniters, cable cutters, etc. These types of explosive and pyrotechnic devices are commonly referred to as "reactive" effectors. Such reactive effectors are typically coupled to electrically operated initiators which, in response to suitable control signals on the bus, initiate or activate the effectors. Further, other (generic) types of energetic HDRMs may include pyro valves.

As discussed hereinabove, the initiators for use in the various types of HDRMs may include their own communication and control circuitry. As a result, the individual initiators possess decision-making ability, and may be referred to as "intelligent" initiators. The initiators may also be equipped with sensors or other diagnostic circuitry whose condition is checked for satisfactory output before functioning is permitted to occur (i.e., the aforementioned BIT).

Figure 2:
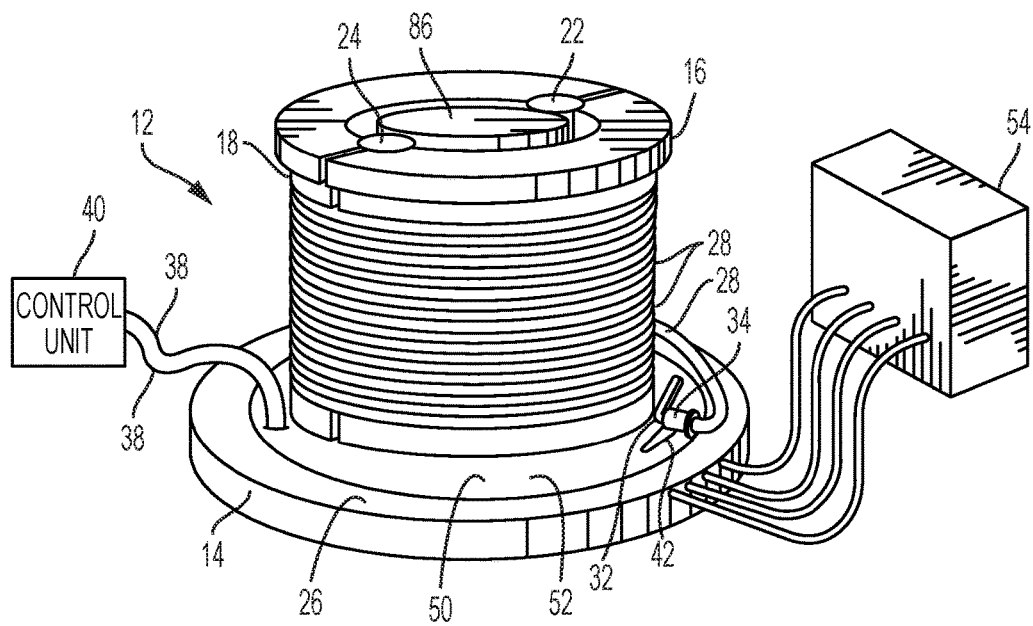
FIG. 2 is a partial isometric view and block diagram of a non-energetic HDRM having an integral tensile preload sensing device according to an embodiment of the present invention.
Figure 3:
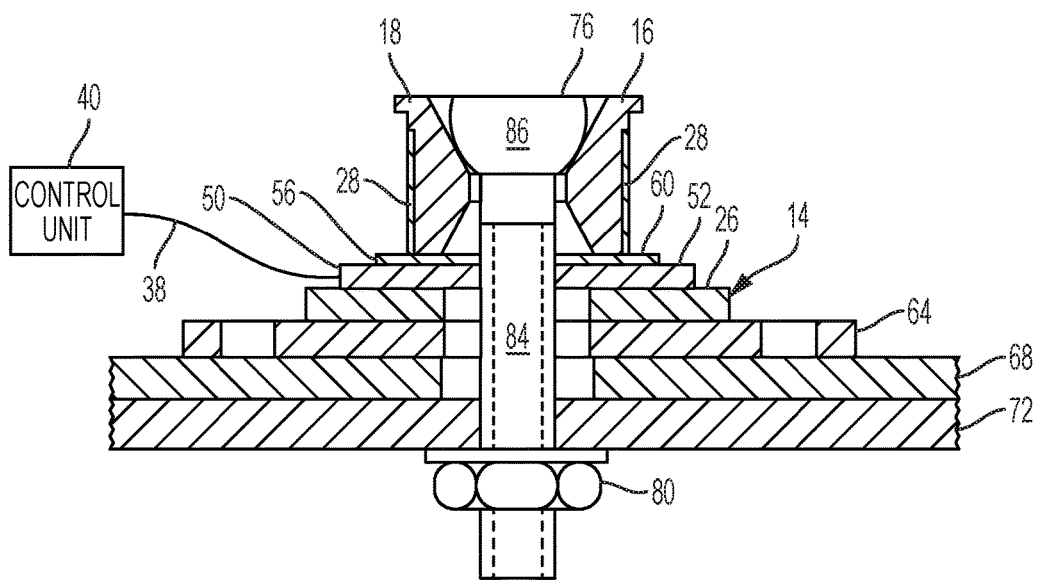
FIG. 3 is a partial cross sectional view and block diagram of a non-energetic HDRM having an integral tensile preload sensing device according to another embodiment of the present invention.

Referring now to FIGS. 2 and 3, there illustrated is an HDRM 12, such as the non-energetic HDRM 104 of FIG. 1, in similar but different embodiments of the present invention. The differences between the two embodiments shown in FIGS. 2 and 3 are explained hereinafter. The HDRM 12 shown in FIGS. 2 and 3 may be somewhat similar to the HDRM described and illustrated in U.S. Pat. No. 6,433,990 (hereinafter "the '990 patent"), the entire contents of which are incorporated by reference herein. However, the HDRM described and illustrated in the '990 patent has been improved upon, as described in detail hereinafter, according to embodiments of the present invention.

As depicted in FIGS. 2 and 3, the HDRM 12 includes a base plate 14, a first half-spool 16, a second half-spool 18, and two restraining pins—a first restraining pin 22, and a second restraining pin 24. In the embodiment of the HDRM 12 of FIG. 2, the two restraining pins 22, 24 are each rigidly mounted to a top surface 52 of a load washer 50. The load washer 50 may be set partially or entirely within a counter bore formed in the base plate 14, depending on the depth of the counter bore and the thickness of the load washer 50, in accordance with an embodiment of the present invention. Placing the load washer 50 within the counter bore (either partially or entirely) serves to facilitate proper alignment of the load washer 50 for load sensing purposes. If the load washer 50 is set entirely within the counter bore, then the top surface 52 of the load washer 50 may be even with a top surface 26 of the base plate 14. Also, the two half-spools 16, 18 may rest movably on the top surface 52 of the load washer 50.

Thus, in accordance with embodiments of the present invention, the load washer 50 comprises a sensing device integral to the HDRM 12 and which senses the amount of an applied tensile preload to the HDRM 12, and communicates the amount of the sensed applied tensile preload to a control unit 40, as described in detail hereinafter.

In the HDRM 12 of FIG. 3, one difference between this embodiment and that of FIG. 2 is that the load washer 50 is disposed on the top surface 26 of the base plate 14. As such, the two restraining pins 22, 24 may each be rigidly mounted to the top surface 52 of the load washer 50, while the two half-spools 16, 18 may rest movably on the top surface 52 of the load washer 50.

Optionally, an additional washer 56 may be disposed on the top surface 52 of the load washer 50, as shown in FIG. 3. As such, the two restraining pins 22, 24 may each be rigidly mounted to a top surface 60 of the additional washer 56, while the two half-spools 16, 18 may rest movably on the top surface 60 of the additional washer 56. If utilized, the additional washer 56 helps to even out and balance the loads applied to the load washer 50.

In accordance with embodiments of the present invention, the load washer 50 may be used to measure the amount of the applied tensile preload to a release pin 76 in the HDRM 12 of FIGS. 2 and 3. However, this is purely exemplary. Other types of HDRMs may have a device or portion other than a release pin to which a tensile preload is applied, and, as such, something other than a compressive load washer may be required to properly sense the amount of tensile preload applied thereto.

The half-spools 16, 18 and the base plate 14 can be made of any number of materials, for example, a metal such as stainless steel which has a relatively high tensile strength and which can handle relatively greater loads. Also, it may be desirable to make the half-spools 16, 18 and the base plate 14 non-conductive. Therefore, the stainless steel may be coated with a layer of aluminum oxide. The half-spools 16, 18 can be made in any number of sizes, depending upon the application. Further, the upper surface 26 of the base plate 14 may also be coated with aluminum oxide to further prevent accidental grounding.

The HDRM 12 may be held in a restrained position by a restraining wire 28 which has two ends, a loop-shaped release end 32 and an attachment end (not shown). The restraining wire 28 may be made of any number of materials with memory (e.g., stainless steel), such that if released it will return to its uncoiled state. The attachment end may be permanently mounted to one of the two half-spools 16, 18. Mounting can be accomplished in any number of ways, such as welding, bolting, etc.

The loop-shaped release end 32 forms an open loop which passes over an insulator hub 34. The insulator hub 34 may be made of a suitable non-conductive material. A fuse wire 42 passes through the insulator hub 34 and is attached thereto. The fuse wire 42 is designed to fail in tension when an electrical current sufficient in value is made to pass through the fuse wire 42 and melts the fuse wire 42.

In FIG. 2, a power supply 54 is provided which may comprise a single power supply or, in the alternative, two redundant power supplies, a primary power supply and a secondary power supply, as described in more detail in the '990 patent, which is incorporated by reference herein in its entirety. Nevertheless, if the power supply 54 is activated, an electrical current will be generated which will pass through the fuse wire 42 causing it to fail in tension. The power supply 54 may be located within a housing (not shown) of the HDRM 12 or may be separate from any type of housing for the HDRM 12. Further, in an embodiment of a networked initiation system 100 such as that of FIG. 1, the power supply may be part of the control unit 108 (e.g., located with the same housing as that of the rest of the control unit 108).

The release pin 76 rests between the two half-spools 16, 18, and extends through an aperture 78 formed in the base plate 14. The release pin 76 has a shaft section 84 and a restraining head portion 86. As best seen in FIG. 3, the shaft section 84 passes through corresponding holes formed in the additional washer 56, the load washer 50, the base plate 14, a flange 64, and two portions 68, 72 of the structure to which the HDRM 12 is bolted using a nut 80.

As shown in FIG. 3, tightening the nut 80 on the bottom of the release pin 76 will pull the spool halves 16, 18 downward against the additional washer 56, the load washer 50, the base plate 14, the mounting flange 64, and the structure 68, 72 to which the nut 80 is secured.

In embodiments of the present invention, the release pin 76 is the portion of the HDRM 12 to which an amount of tensile preload is applied. Thus, it is this applied tensile preload that is desired to be measured or sensed, primarily by the load washer 50 in the embodiments of FIGS. 2 and 3 of the present invention. As such, the load washer 50 is the integral preload sensing device within the HDRM 12, in accordance with embodiments of the present invention.

In exemplary embodiments of the present invention, the load washer 50 may have one or more wires 38 connected between the load washer 50 and a control unit 40. The control unit 40 may contain electrical and/or electronic circuitry that receives analog or digital signals on the wires 38 from the load washer, wherein these signals are indicative of the amount of tensile preload that has been applied to the HDRM 12; in particular, to the release pin 76. The control unit 40 may also contain an analog-to-digital converter ("ADC") to convert analog signals to digital format, a digital processor, and communication circuitry.

Similar to the power supply 54, the control unit 40 may be located within a housing (not shown) of the HDRM 12, or may be separate from any type of housing for the HDRM 12. Also, in various embodiments, the control unit 40 and the power supply 54 may be located together in the same housing, and may also both comprise electrical and/or electronic circuitry that is located on the same circuit board. That is, the functionality of the control unit 40 and the power supply 54 may be combined together. Regardless, in embodiments of the present invention, the control unit 40 may be connected with the interface bus 112 and, thus, to the control unit 108 of the networked initiation system 100 of FIG. 1. That way, the control unit 40 associated with the HDRM 12 may communicate, for example, continuously and in real time, or when queried by the control unit 108 of FIG. 1, the sensed applied tensile preload values on the HDRM 12 as digital values to the control unit 108. Alternatively, the control unit 40 and the power supply 54 may both be a part of (i.e., formed integral with) the control unit 108 in a networked initiation system 100 such as the system 100 of FIG. 1. Regardless of the configuration of the control units 40, 108 and the power supply 54, embodiments of the present invention allow for adjustments to the applied tensile preload as necessary to achieve the proper amount of preload for fastening purposes prior to launch. Thus, embodiments of the present invention overcome the aforementioned shortcomings of the prior art that necessitated the use of a relatively large number of load measuring devices such as strain gauges and manual measurements of the strain gauges.

The restraining wire 28 is held in place (i.e., is wound around the two half-spools 16, 18) by the fuse wire 42 passing over and restraining the insulator hub 34. The shaft section 84 of the release pin 76 is passed into a central aperture until further movement of the shaft section 84 is restrained by the restraining head portion 86 bearing against an interior surface of each of the two half-spools 16, 18. As best seen in FIG. 3, the shaft section 84 comprises a cone shaped portion that sits on a portion of the top surface 60 of the additional washer 56. Thus, when the release pin 76 is torqued or has a load applied, the shaft section 84 bears against the additional washer 56 and, thus, also the load washer 50. As such, the load washer 50 is configured to measure the tensile preload applied to the release pin 76 by way of the restraining head portion 86.

Actuation of the HDRM 12 is typically made by causing electrical current from the power supply 54 to flow through the fuse wire 42, thereby causing the fuse wire 42 to melt or otherwise break or fail in tension. This in turn releases the loop-shaped release end 32 and the restraining wire 28. The restraining wire 28 then unravels, thus no longer restraining movement of the first and second half-spools 16, 18. The load is typically exerting some force against the release pin 76; e.g., in FIG. 3 it is directed downward. Prior to release of the restraining wire 28, movement had been resisted by the restraining head portion 86 bearing against the interior surfaces of the first and second half-spools 16, 18. When the restraining wire 28 unravels, the half-spools 16, 18 are free to move aside, allowing the release pin 76 to drop thorough the HDRM 12, thereby releasing the load.

Embodiments of the present invention have been described for use with a preload sensor. However, other embodiments of the present invention contemplate the measurement of parameters other than the amount of an applied tensile preload. For example, these other parameters of interest may include temperature, vibration, shock and bolt extraction data. These various exemplary parameters may be sensed during launch, deployment, or free flight of the spacecraft. If an element (e.g., satellite) does not function properly, the data related to these other parameters may be useful to determine the cause of the fault. These other sensors may be a part of an HDRM, part of a battery by-pass switch which is a common device found on satellites, or may be a standalone device but connected to the same communication bus as the HDRMs. For example, a temperature sensor can be mounted on the baseplate 14 (see FIG. 2) to measure the temperature of the HDRM 12. Alternately, a temperature sensor could be mounted near the HDRM 12 on an item of interest and wired to the HDRM to utilize the communication bus to return the temperature data to the control unit 40, 108. It should be noted that temperature measurements can made prior to, during, and after deployment of the HDRM 12. Similarly, a vibration or shock sensor can be mounted on the HDRM baseplate 14 or adjacent to the HDRM 12 to measure vibration and shock levels prior to, during, and after activation of the HDRM. Shock data can also be used to measure the time from application of the HDRM firing current to HDRM release.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A hold down and release mechanism ("HDRM"), comprising:
    a hold-then-release mechanism configured to hold an element until the hold-then-release mechanism is commanded to release the element; and
    an integral sensor configured to sense an amount of a parameter of interest associated with the HDRM and to communicate the sensed amount of the parameter of interest to a receiving device.

2. The HDRM of claim 1, wherein the parameter of interest comprises one of tensile preload, temperature, vibration, shock, and time from application of an HDRM firing current to HDRM release of the element.

3. The HDRM of claim 1, wherein the HDRM further comprises a load bearing device to which an amount of tensile preload is applied to hold the element, wherein the tensile preload comprises the parameter of interest, and wherein the integral sensor is configured to sense the amount of tensile preload applied to the load bearing device and to communicate the sensed amount of applied tensile preload to the receiving device.

4. The HDRM of claim 1, wherein the load bearing device comprise a release pin and the integral sensor comprises a compressive load washer in contact with the release pin.

5. The HDRM of claim 4, further comprising an additional washer disposed in contact with the release pin and the compressive load washer, wherein the additional washer is configured to even out the applied tensile preload on the compressive load washer.

6. The HDRM of claim 1, wherein the HDRM comprises one of a non-energetic HDRM and an energetic HDRM.

7. The HDRM of claim 6, wherein the non-energetic HDRM includes a split spool release device having a link wire that breaks upon application of electrical energy.

8. The HDRM of claim 1, wherein the receiving device comprises a control unit configured to receive from the integral sensor the communicated sensed amount of the parameter of interest.

9. The HDRM of claim 8, wherein the control unit is configured to communicate with a networked initiation system comprising a controller, the HDRM, a plurality of additional HDRMs, and an interface bus connecting together the controller, the HDRM and the plurality of additional HDRMs.

10. The HDRM of claim 9, wherein the HDRM is addressable within the networked initiation system.

11. The HDRM of claim 1, wherein the element is attached to a spacecraft, and wherein the element comprises a solar array, an antenna reflector, a radiator, an instrument boom, a propulsion pointing actuator, a door, or a sensor.

12. A networked initiation system, comprising:
    a control unit;
    at least one hold down and release mechanism ("HDRM") configured to hold in place an element and to release the held element upon receipt of an activate command from the control unit, wherein the at least one HDRM comprises a hold-then-release mechanism configured to hold the element until the hold-then-release mechanism is commanded by the activate command from the control unit to release the element, the at least one HDRM also comprises an integral sensor configured to sense an amount of a parameter of interest associated with the at least one HDRM and to communicate the sensed amount of the parameter of interest to the control unit; and an interface bus configured to connect together the control unit and the at least one HDRM, to provide power from the control unit to the at least one HDRM, and to communicate between the control unit and the at least one HDRM.

13. The networked initiation system of claim 12, wherein the parameter of interest comprises one of tensile preload, temperature, vibration, shock, and time from application of an HDRM firing current to HDRM release of the held element.

14. The networked initiation system of claim 12, wherein the at least one HDRM further comprises a load bearing device to which an amount of tensile preload is applied, wherein the integral sensor is configured to sense the amount of tensile preload applied to the load bearing device and to communicate the sensed amount of applied tensile preload to the control unit, the tensile preload comprising the parameter of interest.

15. The networked initiation system of claim 14, wherein the load bearing device comprises a release pin and the integral sensor comprises a compressive load washer in contact with the release pin.

16. The networked initiation system of claim 15, further comprising an additional washer disposed in contact with the release pin and the compressive load washer, wherein the additional washer is configured to even out the applied tensile preload on the compressive load washer.

17. The networked initiation system of claim 12, wherein the element comprises a solar array, an antenna reflector, a radiator, an instrument boom, a propulsion pointing actuator, a door, or a sensor.

18. The networked initiation system of claim 12, wherein the at least one HDRM comprises a split spool release device ("SSRD") having a link wire that breaks upon application of electrical energy upon receipt by the at least one HDRM of the activate command from the control unit.

19. The networked initiation system of claim 12, wherein the at least one HDRM comprises a non-energetic HDRM.

20. The networked initiation system of claim 12, wherein the at least one HDRM comprises an energetic HDRM.

* * * * *